(12) United States Patent
Nagata

(10) Patent No.: US 8,224,328 B2
(45) Date of Patent: Jul. 17, 2012

(54) MOBILE COMMUNICATION SYSTEM, BASE STATION AND HAND-OVER METHOD USED IN MOBILE COMMUNICATION SYSTEM

(75) Inventor: Jun Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 989 days.

(21) Appl. No.: 11/871,279

(22) Filed: Oct. 12, 2007

(65) Prior Publication Data

US 2008/0108354 A1 May 8, 2008

(30) Foreign Application Priority Data

Nov. 8, 2006 (JP) ................................. 2006-302192

(51) Int. Cl.
*H04W 36/00* (2009.01)
(52) U.S. Cl. ........... 455/436; 455/48; 455/439; 370/331
(58) Field of Classification Search .......... 455/436–444, 455/561, 48; 370/331
See application file for complete search history.

(56) References Cited

U.S. PATENT DOCUMENTS

| | | | |
|---|---|---|---|
| 5,991,626 A * | 11/1999 | Hinz et al. | 455/436 |
| 6,904,025 B1 * | 6/2005 | Madour et al. | 370/328 |
| 7,518,994 B2 * | 4/2009 | Zhang et al. | 370/235 |
| 2005/0237976 A1 * | 10/2005 | Walldeen et al. | 370/331 |

FOREIGN PATENT DOCUMENTS

| | | |
|---|---|---|
| JP | 2001128212 | 5/2001 |
| JP | 2003324761 | 11/2003 |
| JP | 2004235883 A | 8/2004 |
| JP | 2005026941 | 1/2005 |
| JP | 2006237888 A | 9/2006 |
| JP | 2006246481 A | 9/2006 |

OTHER PUBLICATIONS

Japanese Office Action for JP2006-302192 issued Sep. 20, 2011.
Samsung, Inter ENB handover: Data Unit Forwarding for DL?, 3GPF TSG-RAN2 Meeting #53 Tdoc R2-061169, URL, http://3gpp.org/ftp/tsg_ran/WG2_RL2/TSGR2_53/Documents/R2-061169.zip, May 8; 2006.

* cited by examiner

*Primary Examiner* — Kamran Afshar
*Assistant Examiner* — Sayed T Zewari

(57) ABSTRACT

Disclosed is a mobile communication system which includes user equipment, radio base stations which communicate with the user equipment, and an upper level apparatus which communicates with the radio base stations. Each of the radio base stations includes a control unit and an inter-node communication unit. The control unit hands over a communication with user equipment to a hand-over target base station. The control unit prepares a forwarding packet which includes data addressed to the user equipment and is not transmitted and delay value identification information for specifying a delay value of the data that is not transmitted at the time of a hand-over. The inter-node communication unit transmits forwarding packets to a hand-over target base station.

20 Claims, 7 Drawing Sheets

MOBILE COMMUNICATION SYSTEM, BASE STATION AND HAND-OVER METHOD USED IN MOBILE COMMUNICATION SYSTEM

RELATED APPLICATIONS

This application is based on Japanese Patent Application No. JP 2006-302192 filed on Nov. 8, 2006, and including a specification, claims, drawings and summary. The disclosure of the above Japanese Patent Application is incorporated herein by reference in its entirety.

BACKGROUND OF THE INVENTION

1. Field of the Invention

The present invention relates to a hand-over technology in a mobile communication system.

2. Description of the Related Art

FIG. 7 shows an example of a mobile communication network (hereinafter, referred to as 3G network) standardized by the 3GPP (3rd Generation Partnership Project).

A mobile communication system 100 shown in FIG. 7 includes a core network 101 and a sub-network (Universal Terrestrial Radio Access Network (UTRAN) 102. The UTRAN 102 is composed of a plurality of Radio Network Systems (RNSs) 103-1 and 103-2.

Each of the RNSs 103-1 and 103-2 includes a radio network controller (RNC) 111 and a plurality of radio base stations (NodeBs) 112-1, 112-2 and others. A mobile terminal (i.e. user equipment) which is not shown in FIG. 7 changes a NodeB to connect with while moving. User equipment can continue a communication by applying the changing method. The changing method for a NodeB is called a hand-over.

At the time of a hand-over, the data which the user equipment cannot receive from a handover source radio base station (NodeB 112-1) is transmitted from the radio network controller (RNC) 111 to a hand-over target base station (NodeB 112-2). The user equipment can receive the data which is not received from the NodeB 112-1, from the NodeB 112-2. In a mobile communication system in which a soft hand-over technology is used, the RNC 111 simultaneously transmits data from both of the source radio base station (NodeB) 112-1 and a target radio base station (NodeB) 112-2 to the user equipment.

In a 3G network, the RNC 111 gives transmission timing to a radio base station (NodeB) for downlink data whose delay is limited. When it is expected that a delay exceeds a permitted delay value, even if a hand-over occurs, the RNC 111 does not transmit data to a hand-over target NodeB 112-2. In a 3G network, a RNC manages handling of downlink data in an integrated fashion. For this reason, in a 3G network, a delay of data can be kept below a permitted delay value.

In recent years, the 3GPP has been studying a next generation network (hereinafter, referred to as LTE/SAE network) under the name of Long Term Evolution (LTE) and System Architecture Evolution (SAE). The object of this study is to improve a throughput of user data, to reduce a call connection delay, to reduce a transmission delay of user data, to reduce a number of nodes and to reduce a number of interfaces to be standardized.

FIG. 1 shows an example of the LTE/SAE network. FIG. 1 is a figure also showing a configuration of an example of a mobile communication system according to the present invention. However, in a range shown in FIG. 1, the network is the same as the LTE/SAE network. Accordingly, in this specification, both of related arts and exemplary embodiments will be described with reference to FIG. 1.

Referring to FIG. 1, an LTE/SAE network 1 includes an Evolved Core Network (Evolved CN) 2 which is a core network and an Evolved Universal Terrestrial Radio Access Network (EUTRAN) 3 which is a sub-network. The EUTRAN 3 accommodates a plurality of nodes that include radio base stations (enhanced NodeB; eNodeB) 11-1 and 11-2. A mobile terminal, that is user equipment (UE) 4, is shown in FIG. 1. The UE communicates with eNodeBs 11-1 and 11-2.

When the user equipment 4 performs a hand-over between eNodeBs in the LTE/SAE network 1, it is considered to perform following data transmission. Suppose, for example, that a part of downlink data transmitted from the Evolved CN 2 to the source eNodeB 11-1 is not transmitted to user equipment. In such case, the hand-over source base station 11-1 transmits the data which is not transmitted to the hand-over target base stations 11-2. The hand-over target base station 11-2 transmits the transmittes data to the user equipment. In the LTE/SAE network 1, an occurrence of data that is not transmitted to user equipment during a hand-over is reduced.

In the LTE/SAE network 1 with such configuration, a delay value of downlink data is usually limited. A radio base station transmits data to user equipment so that a delay value of the data is equal or smaller than a permitted delay value. However, when a radio base station cannot transmit data to user equipment with a delay value which is equal or smaller than the permitted delay value, the radio base station performs a predetermined process to the data. The predetermined process includes disposal of the data.

JP2003-324761A describes that when a hand-over is performed, a hand-over source base station transmits a packet number or the like whose acknowledgement is not received to a hand-over target base station.

In JP2005-026941A, it is described that a mobile IP network system in which a packet within a packet transmission stop time is disposed. The packet transmission stop time is calculated based on a line speed, a line quality, the number of times that a hand-over is performed per unit time and traffic.

JP2001-128212A discloses that a radio network controller controls a timing of transmission to a radio terminal in a hand-over target base station based on a difference (DL1-DL2) between a transmission delay time (DL1) in a radio base station (A) and a transmission delay time (DL2) in a radio base station (B).

In FIG. 1, the time when user equipment 4 performs a hand-over from a radio base station (eNodeB) 11-1 to a radio base station (eNodeB) 11-2 is considered. Furthermore, at the time, suppose that data (including data whose acknowledgement from the user equipment 4 is not received by the eNodeB 11-1) which has not been transmitted to the user equipment 4, before the user equipment 4 disconnects the radio base station (eNodeB) 11-1, is remaining. In such case, the eNodeB 11-1 transmits the data that has not been transmitted, to the eNodeB 11-2. However, the eNodeB 11-2 cannot know a delay value, of the transmitted data, that is generated in the eNodeB 11-1. Moreover, the transmitted data delays in the eNodeB 11-2. As a result, a delay value of the transmitted data may exceed a permitted delay value. The eNodeB 11-2 cannot know the fact. Accordingly, the target eNodeB 11-2 cannot necessarily perform a predetermined process mentioned above.

SUMMARY OF THE INVENTION

The present invention was made to solve the foregoing and other exemplary problems, drawbacks, and disadvantages. A first exemplary feature of the present invention is to provide a mobile communication system technology which can reduce a possibility that a delay value of a downlink data which is produced by data transmission for a hand-over exceeds a permitted delay value.

According to a first exemplary aspect of the invention, there is provided a mobile communication system which includes user equipment, a plurality of radio base stations that communicate with said user equipment, and an upper level apparatus that communicates with said plurality of radio base stations. Each of radio base stations includes a control unit and an inter-node communication unit. The control unit hands over a communication with user equipment to a hand-over target base station. The control unit prepares a forwarding packet in which data that is not transmitted to user equipment and delay value identification information for specifying a delay value of the data that is not transmitted at the time of a hand-over are included. The inter-node communication unit transmits these forwarding packets to a hand-over target base station.

Other exemplary features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Exemplary embodiments of the present invention will now be described in detail in accordance with the accompanying drawings.

Figure 1:
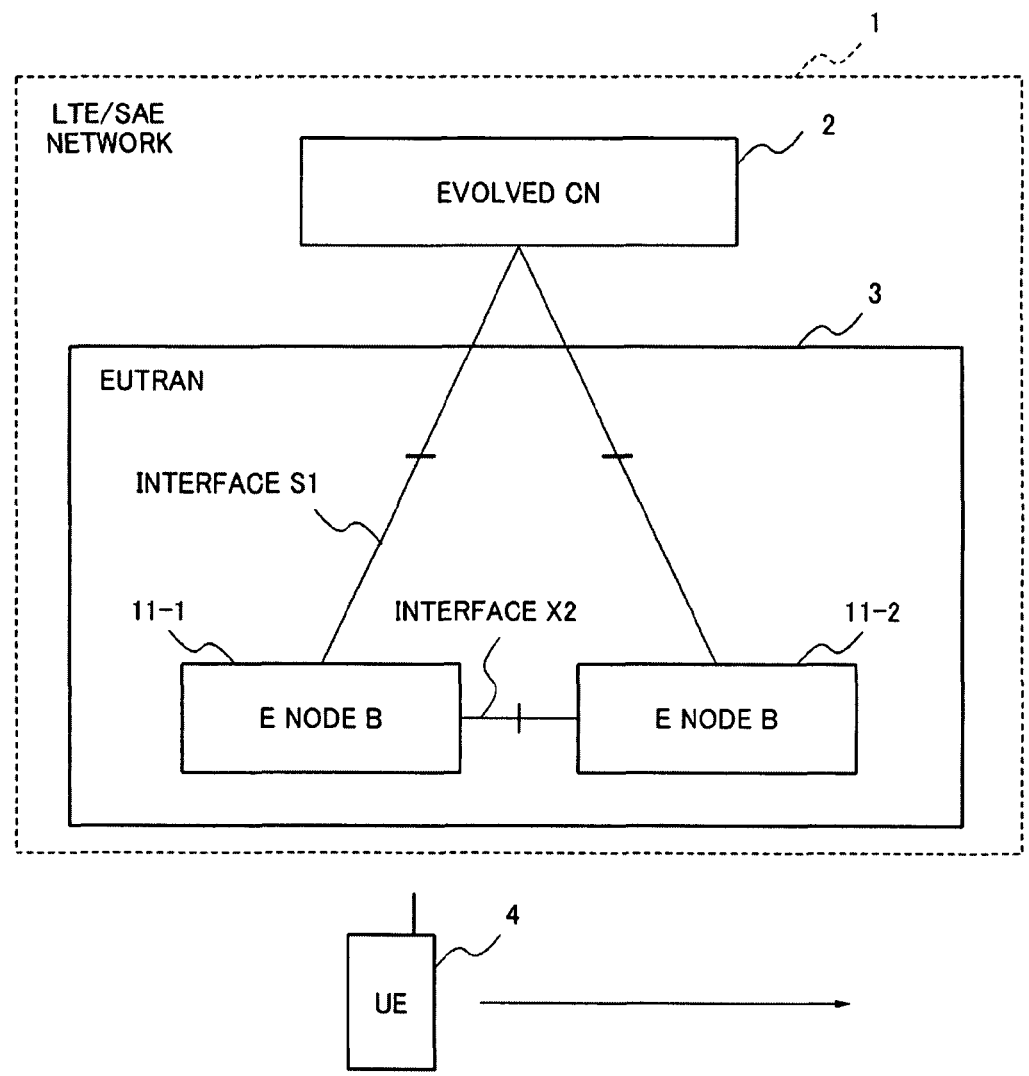
FIG. 1 is a figure showing a configuration of a mobile communication system according to the present invention and a related art.

FIG. 1 is a figure showing an exemplary configuration of a mobile communication system to which the present invention is applied. FIG. 1 shows an LTE/SAE network that is studied by the 3GPP as an example of a mobile communication system.

[Exemplary Embodiment 1]

Referring to FIG. 1, the LTE/SAE network 1 includes an Evolved Core Network (Evolved CN) 2 which is a core network and an Evolved Universal Terrestrial Radio Access Network (EUTRAN) 3 which is a sub-network. The sub-network (EUTRAN) 3 accommodates a plurality of radio base stations (eNodeB) 11-1 and 11-2.

User equipment (UE) 4 which communicates with the radio base stations (eNodeB) 11-1 and 11-2 is shown in FIG. 1.

Each of the radio base stations (eNodeB) 11-1 and 11-2 is a node in which a part of a function of a radio network controller (RNC) of a 3G network and a function corresponding to a radio base station (NodeB) are integrated.

A radio base station (eNodeB) is connected to a core network via an interface "S1". The radio base stations 11-1 and 11-2 are connected with each other via an interface "X2".

The interfaces "S1" and "X2" are logical interfaces. Practically, the interface "X2" may be a part of the interface "S1". The interfaces "S1" and "X2" can be connected with an external network such as the Internet, a wireless Local Area Network (LAN) or the like.

The user equipment 4 receives data (downlink data) from an external network or other user equipment. The downlink data is transmitted from the core network 2 to a radio base station (for example, the radio base station (eNodeB) 11-1) to which the user equipment 4 is currently connected. A radio base station transmits the downlink data to the user equipment 4 via a radio link.

When the user equipment 4 performs a hand-over to another radio base station (for example, eNodeB 11-2) while continuing a communication, a hand-over source base station (eNodeB 11-1) has not frequently completed a transmission of all downlink data received from the core network 2 toward the user equipment 4. That is, the hand-over source base station 11-1 usually leave data that has not been transmitted to the user equipment 4 (including data which is already transmitted, but for which an acknowledgement has not received from user equipment). The hand-over source base station 11-1 transmits the data to the hand-over target base station (eNodeB 11-2) via the interface "X2".

At the time, the hand-over source base station (eNodeB 11-1) transmits data that has not been transmitted to the user equipment 4 (including data which has been already transmitted, but for which an acknowledgement has not been received) and information of a delay value (Delayed Time) generated in he eNodeB 11-1 to the eNodeB 11-2.

Figure 2:
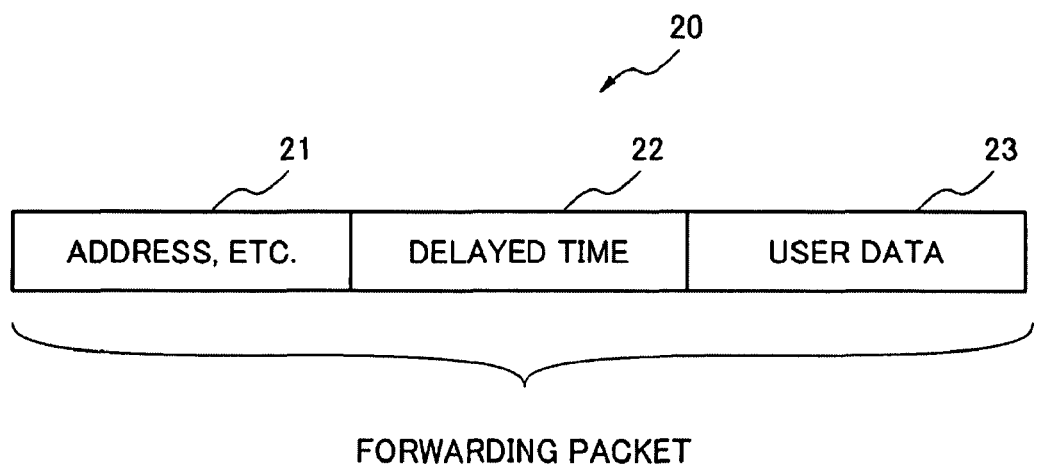
FIG. 2 is a figure showing an example of a configuration of a forwarding packet.

FIG. 2 shows an example of a forwarding packet (Forwarding Packet). A forwarding packet 20 includes information indicating an address (Address, etc.) 21, delay value information (Delayed Time) 22 measured in the hand-over source base station (eNodeB 11-1) and user data (User Data) 23.

Here, the delay value information represents a period of time which a radio base station (eNodeB) holds the user data 23. The user data 23 is data which is transmitted from the core network (Evolved CN) 2 to the user equipment 4 via the radio base station (eNodeB 11-1). When receiving the data from the core network 2, the radio base station (eNodeB 11-1) holds the data in a memory part described below. The held user data is transmitted to the user equipment 4. The eNodeB 11-1 holds the user data in the memory part until an acknowledgement is sent back from the user equipment 4. The time that the data is held in the memory part is a delay value in the radio base station.

That is, in the exemplary embodiment, the time that data is held in a memory part corresponds to "delay value identification information for specifying the time that the data which has not been transmitted is held in an base station" mentioned above.

Usually, a delay value of data in the eNodeB 11-1 differs from that of the eNodeB 11-2. However, the delay values of the data are sometimes identical. A permitted delay value of data is specified for each of the eNodeBs 11-1 and 11-2. Each of the eNodeBs 11-1 and 11-2 controls a data transmission so that a delay value is equal or less than the permitted delay value.

When the user equipment 4 performs a hand-over from the eNodeB 11-1 to the eNodeB 11-2, as mentioned above, data which has not been transmitted from eNodeB 11-1 to the user equipment 4 (that is, data for which an acknowledgement has not been received from user equipment) is transmitted to a hand-over target base station (eNodeB 11-2). The eNodeB 11-2 transmits the transmitted packet 20 to the user equipment 4.

Figure 3:
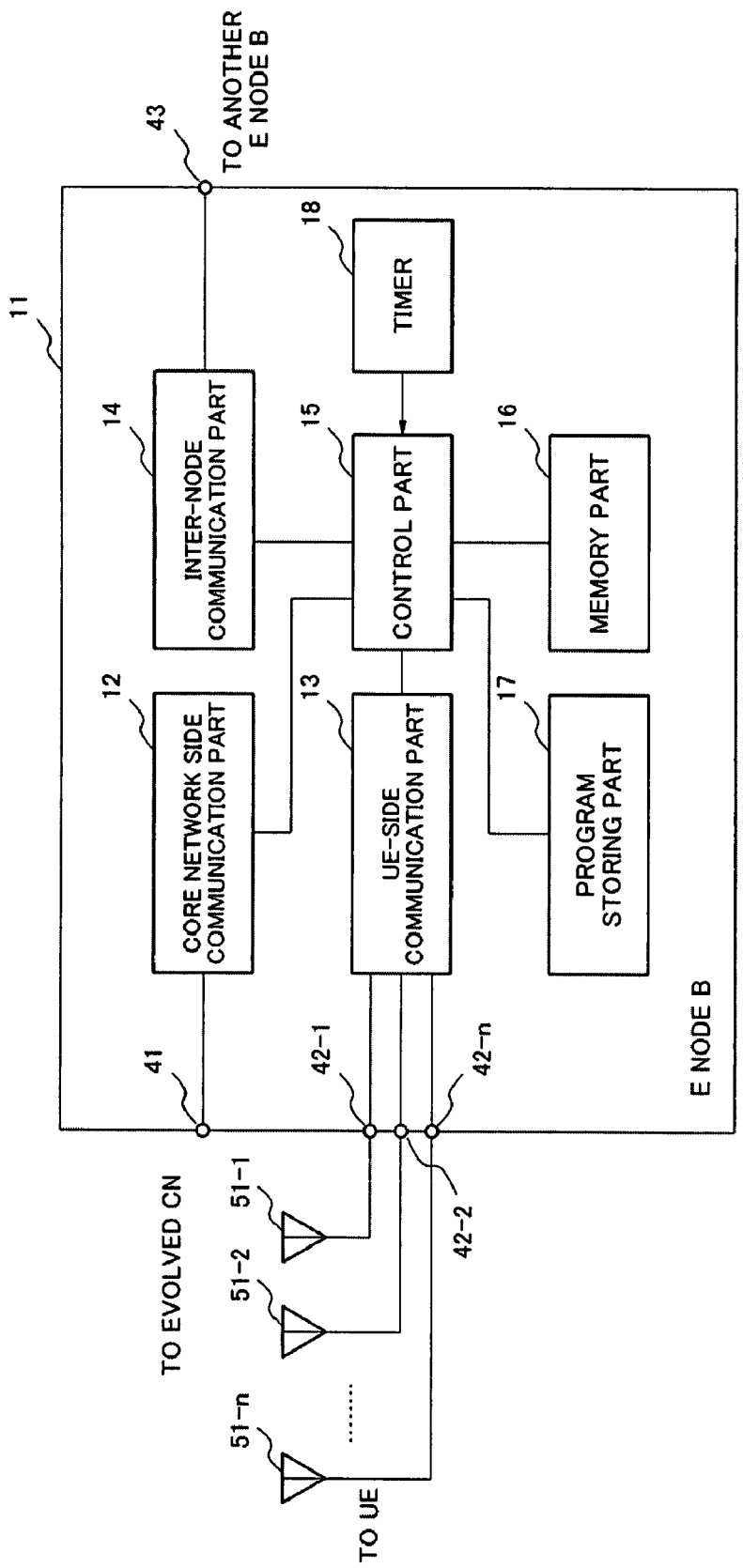
FIG. 3 is a block diagram showing an exemplary configuration of a radio base station in the present invention.

Next, a configuration of an example of a radio base station (eNodeB) 11 will be described. FIG. 3 is a figure showing an example of a configuration of a radio base station (eNodeB). Further, a configuration of radio base station apparatuses (eNodeBs) 11-1 and 11-2 shown in FIG. 1 is the same as a configuration of a radio base station apparatus shown in FIG. 3. Accordingly, in FIG. 3, a reference mark "11" represents a radio base station.

The radio base station (eNodeB) 11 shown in FIG. 3 includes a core network side communication part 12, an UE-side communication part 13, an inter-node communication part 14, a control part 15, a memory part 16, a program storing part 17, a timer 18 and connection terminals 41, 42-1 to 42-$n$ (where n is a positive integer), and 43, and antennas 51-1 to 51-$n$.

The core network side communication part 12 is connected with the core network (Evolved CN) 2 via the connection terminal 41. The UE-side communication part 13 is connected with the antennas 51-1 to 51-$n$ via the connection terminals 42-1 to 42-$n$, respectively. The inter-node communication part 14 is connected with an inter-node communication part of another radio base station (eNodeB) via the connection terminal 43.

The UE-side communication part 13 communicates with the user equipment 4 via the antennas 51-1 to 51-$n$.

The control part 15 controls the core network side communication part 12, the UE-side communication part 13, the inter-node communication part 14, the memory part 16 and the program storing part 17. The timer 16 is used for a delay value measurement mentioned above.

The control part 13 temporarily stores data that the core network side communication part 12 receives from the core network 2 in the memory part 16. The time that the data is stored in the memory part 16 corresponds to a delay value of the data in the radio base station (eNodeB) 11.

The program storing part 17 stores a program of a hand-over method mentioned below. For example, the control part 13 includes a CPU and executes the program so that a radio base station performs the operation mentioned below. A matter described with reference to FIG. 3 is common to an exemplary embodiment described below.

[Operation of a first exemplary embodiment]

Figure 4:
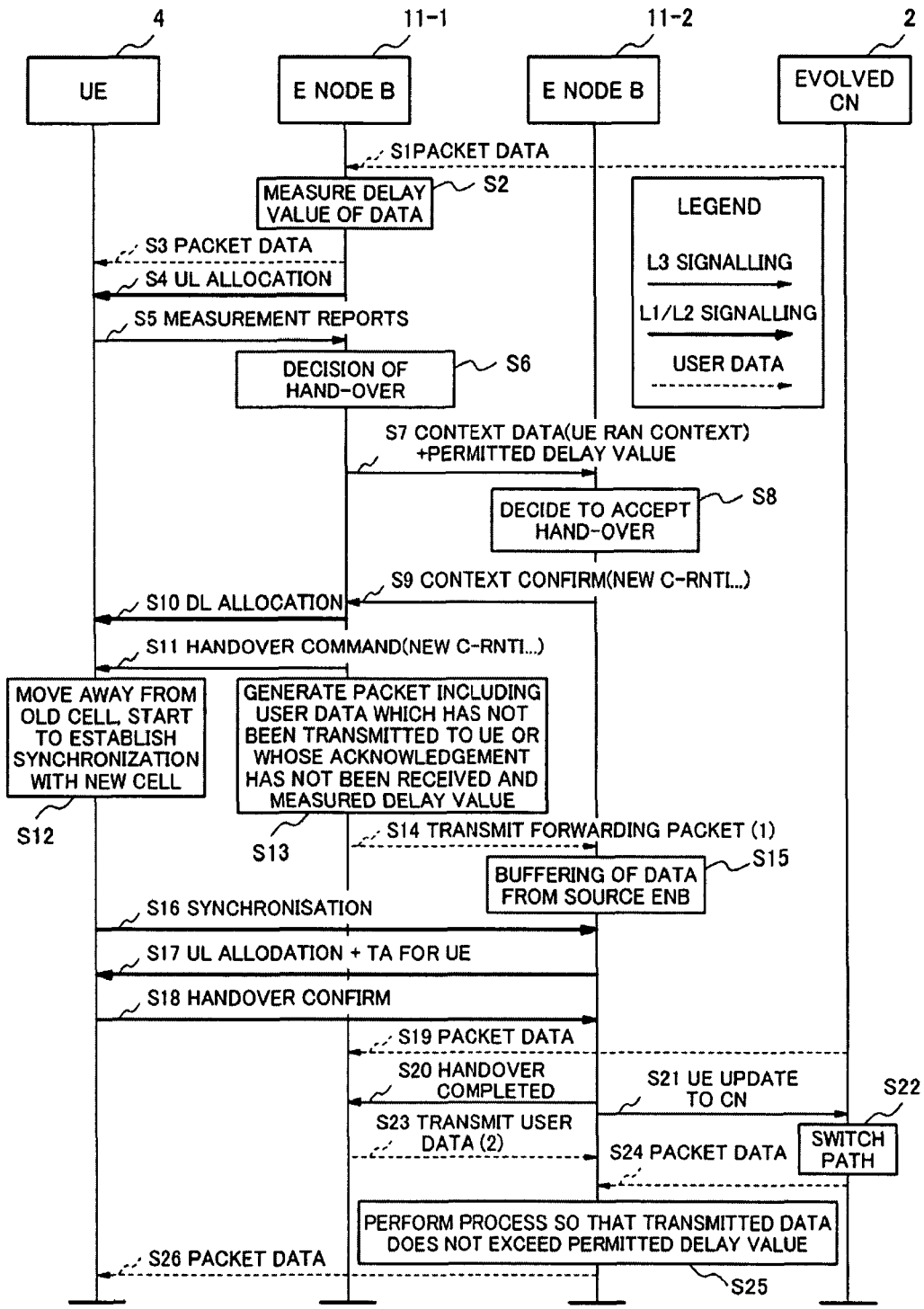
FIG. 4 is a sequence chart illustrating an example of an operation of a mobile communication system according to the present invention.

Next, an operation of the first exemplary embodiment of the present invention will be described with reference to FIG. 4. FIG. 4 is a sequence chart illustrating an operation of a mobile communication system according to the exemplary embodiment.

FIG. 4 shows the case in which the user equipment 4 performs a hand-over from the radio base station (eNodeB) 11-1 to the radio base station (eNodeB) 11-2 while receiving downlink data whose delay is limited in the LTE/SAE network 1.

An upper level apparatus (not shown) in the core network 2 transmits packet data to the radio base station (eNodeB) 11-1 with which the user equipment 4 is connected (step S1).

Upon receipt of the packet data from the upper level apparatus, the radio base station (eNodeB) 11-1 stores the packet data in the memory part 16. The control part 13 starts to measure a delay value of the data using the timer 18 for each packet received from the upper level apparatus (step S2).

The radio base station (eNodeB) 11-1 holds packet data for a predetermined time and then transmits the packet data to the user equipment 4 from the UE-side communication part 13 (step S3).

The radio base station (eNodeB) 11-1 transmits signaling information "UL allocation" to the user equipment 4 (step S4). In response to the "UL allocation", the user equipment 4 transmits signaling information "Measurement Reports" to the eNodeB 11-1 (step S5).

Here, the control part 13 of the radio base station (eNodeB) 11-1 determines to hand over the user equipment 4 to a cell managed by the radio base station (eNodeB) 11-2 based on a received "Measurement Reports" (Step S6).

Next, the eNodeB 11-1 adds a permitted delay value of the apparatus 11-1 to signaling information (Context data (UE RAN Context)) using the inter-node communication part 14 and transmits the information to the radio base station (eNodeB) 11-2 (step 37). The radio base station (eNodeB) 11-2 determines to accept a hand-over (step S8).

The hand-over target base station 11-2 transmits "Context Confirm (new C-RNT)" to a hand-over source base station (eNodeB 11-1) as signaling information (step S9).

The hand-over source base station 11-1 transmits signaling information "DL allocation" to the user equipment 4 (step S10). The hand-over source base station 11-1 transmits signaling information "Handover Command (new C-RNTI)" to the user equipment 4 (step S11).

The user equipment 4 receives signaling information "Handover Command (new C-RNTI)" in step S11 After this, the user equipment 4 leaves an original cell (a cell managed by the eNodeB 11-1). The user equipment 4 starts to establish synchronization with a new cell (a cell managed by the NodeB 11-2) (step S12).

The hand-over source base station 11-1 transmits the "Handover Command (new C-RNTI)" in step S11 and then generates a forwarding packet (forwarding packet 20 shown in FIG. 2) including data which has not been transmitted to the user equipment 4 (including data whose acknowledgement from the user equipment is not received) and a measured delay value (Delayed Time 22 shown in FIG. 2) (step S13). The hand-over source base station 11-1 transmits the generated forwarding packet 20 to the hand-over target base station 11-2 (step S14). This is a first transmission of the forwarding packet 20. When data which has not been transmitted is left in the memory part 16, processes in step S13 and step S14 are repeated until data addressed to the user equipment 4 disappears in the memory part 16.

Upon receiving the forwarding packets 20, the hand-over target base station (eNodeB) 11-2 performs a buffering of the received forwarding packet 20 (step S15). The hand-over target base station 11-2 recognizes a delay value of a forwarding packet in a hand-over source base station based on the value of Delayed Time 22 in the forwarding packet.

On the other hand, the user equipment 4 transmits signaling information "Synchronization" for establishing synchronization to the hand-over target base station 11-2 (step S16).

The hand-over target base station 11-2 which has received the "Synchronization" transmits signaling information "UL allocation+TA for UE" to the user equipment 4 (step S17).

In response to the signaling information (UL allocation+TA for UE), the user equipment 4 transmits signaling information for confirming a hand-over, that is, "Handover Confirm" to the hand-over target base station 11-2 (step S18).

Even at the time, an upper level apparatus on the core network 2 transmits packet data whose destination is the user equipment 4 to the hand-over source base station 11-1 (step S19). The reason is as follows.

The radio base station 11-1 is notified of determination on a hand-over from the radio base station 11-1 to the radio base station 11-2 in step S9. Also, the user equipment 4 is notified of the determination in step S11. However, at the time, the upper level apparatus on the core network 2 has not been notified of the determination yet. Accordingly, at the time, if packet data whose destination is the user equipment 4 remains, the upper level apparatus on the core network 2 transmits the data to the hand-over source base station 11-1.

Data transmitted to the hand-over source base station 11-1 in the step S19 is stored in the memory part 16. The control part 15 of the hand-over source base station starts to measure the time that the data is held in the station by using the timer 18. The held data is also transmitted to the hand-over target base station 11-2 in a form of a forwarding packet shown in FIG. 2. A buffering of the transmitted data is also performed in the hand-over target base station 11-2.

In step S20, the hand-over target base station 11-2 transmits signaling information "Handover completed" which indicates completion of a hand-over to the hand-over source base station 11-1.

The hand-over target base station 11-2 transmits signaling information (UE Update to Evolved CN) which indicates that the user equipment 4 has performed a hand-over to the radio base station 11-2 to an upper level apparatus in the core network 2 (step S21).

The upper level apparatus on the core network 2 which has received the "UE Update to Evolved CN" recognizes that the user equipment 4 has performed a hand-over from the radio base station 11-1 to the radio base station 11-2. The upper level apparatus in the core network 2 switches a path (step S22). The upper level apparatus changes a destination of packet data from the hand-over source base station 11-1 to the hand-over target base station 11-2 (step S24).

On the other hand, the hand-over source base station 11-1 transmits packet data from the core network 2 in step S19 and user data which has not been transmitted to the user equipment 4 to the hand-over target base station 11-2 (step S23). The transmission in step S23 is the last packet transmission from the hand-over source base station 11-1 to the hand-over target base station 11-2.

The hand-over target base station 11-2 transmits the forwarding packet 20 received from the hand-over source base station 11-1 in step S14 and step S23 and packet data received from the core network 2 in step S24 to the user equipment 4. Then, the hand-over target base station 11-2 performs a transmission process so that packet data transmitted to the user equipment 4 does not exceed a permitted delay value that is specified for the hand-over target base station 11-2 (eNodeB 11-2) by referring a measured delay value (Delayed Time 22 shown in FIG. 2), which is attached for each transmitted packet (step S25).

The hand-over target base station 11-2 transmits the packet data to the user equipment 4 (step S26).

In the exemplary embodiment, when a hand-over target base station transmits data transmitted from a hand-over source base station to user equipment, the hand-over target base station can perform a data transmission process to the user equipment in view of a delay value produced in the hand-over source base station.

[Exemplary Embodiment 2]

In the above-mentioned exemplary embodiment 1, each of the core network 2, the radio base station 11-1 and the radio base station 11-2 include their own timers. Each apparatus performs a process with reference to the timer. It is not necessarily for each timer to be exactly synchronized.

In contrast, in the exemplary embodiment 2, each timer of an upper level apparatus in the core network 2, the radio base stations 11-1 and the radio base stations 11-2 is synchronized. In the exemplary embodiment, all the timer which are set to an exact time are collectively called as a "common timer".

Figure 5:
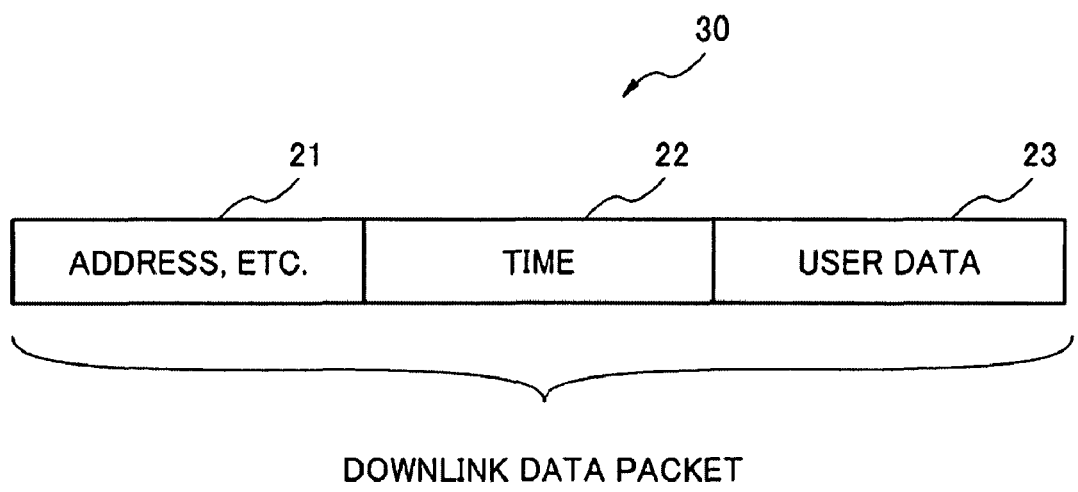
FIG. 5 is a figure showing another example of a forwarding packet that can be applied for the present invention.

FIG. 5 is a figure showing an example of a forwarding packet in the exemplary embodiment 2. Further, because some components shown in FIG. 5 are the same as that shown in FIG. 2, the same reference number is used for them and duplicated descriptions will be omitted.

Referring to FIG. 5, a forwarding packet 30 includes information indicating an address (Address, etc.) 21, a predetermined time (Time) 24 of the common timer and user data (User Data) 23.

An upper level apparatus in a core network or the hand-over source base station 11-1 measures one of the following times (1) to (3) using the timer and records a measured time in "TIME" shown in FIG. 5, (1) a time that an upper level apparatus in the core network 2 receives downlink data.

(2) a time that an upper level apparatus in the core network 2 transmits downlink data to a radio base station.

(3) a time that a radio base station receives downlink data from an upper level apparatus in the core network 2.

The hand-over source base station transmits a forwarding packet shown in FIG. 5 to a hand-over target base station.

That is, in the exemplary embodiment 2, one of these times (1), (2) and (3) is used as "delay value identification information" mentioned above.

Further, regarding the time (1) or time (2), an upper level apparatus notifies a radio base station of the time of (1) or the time of (2) using a packet that includes the same format as shown in FIG. 5.

When receiving the forwarding packet 30, the hand-over target base station 11-2 performs a transmission process to user equipment so that a delay value does not exceed a permitted delay value by referring the time recorded in the "Time" 24.

In the exemplary embodiment 2, by using the common timer, the hand-over source base station 11-1 can omit a process for measuring a delay value of data for each packet in the station 11-1.

[Exemplary Embodiment 3]

In exemplary embodiments 1 and 2, how to perform a data processing is not described in detail, when a delay exceeds a permitted delay value in the hand-over target base station 11-2. An example of the processing will be described in the exemplary embodiment 3. Further, the processing can be used for the exemplary embodiments 1 and 2 mentioned above.

In the exemplary embodiment 3, when a delay of data which has not been transmitted to the user equipment 4 does not exceed a permitted delay value, the hand-over target base station 11-2 transmits data to the user equipment 4. However, the hand-over target base station 11-2 disposes of data whose delay exceeds a permitted delay value.

In the exemplary embodiment 3, only the data whose delay does not exceed a permitted delay value can be transmitted to the user equipment 4. Further, in the exemplary embodiment, it is clear that either packet shown in FIG. 2 or FIG. 5 can be used as an inter-node forwarding packet.

[Exemplary Embodiment 4]

In the exemplary embodiment 4, another example of a process in which a delay of data exceeds a permitted delay value will be described.

In the exemplary embodiment 3, all of data whose delay exceeds a permitted delay value are disposed of. In the exemplary embodiment 4, a transmission order of data to the user equipment 4 is controlled so that a delay does not exceed a permitted delay value. That is, in the exemplary embodiment 4, long-delayed data is preferentially transmitted to the user equipment 4.

Figure 6:
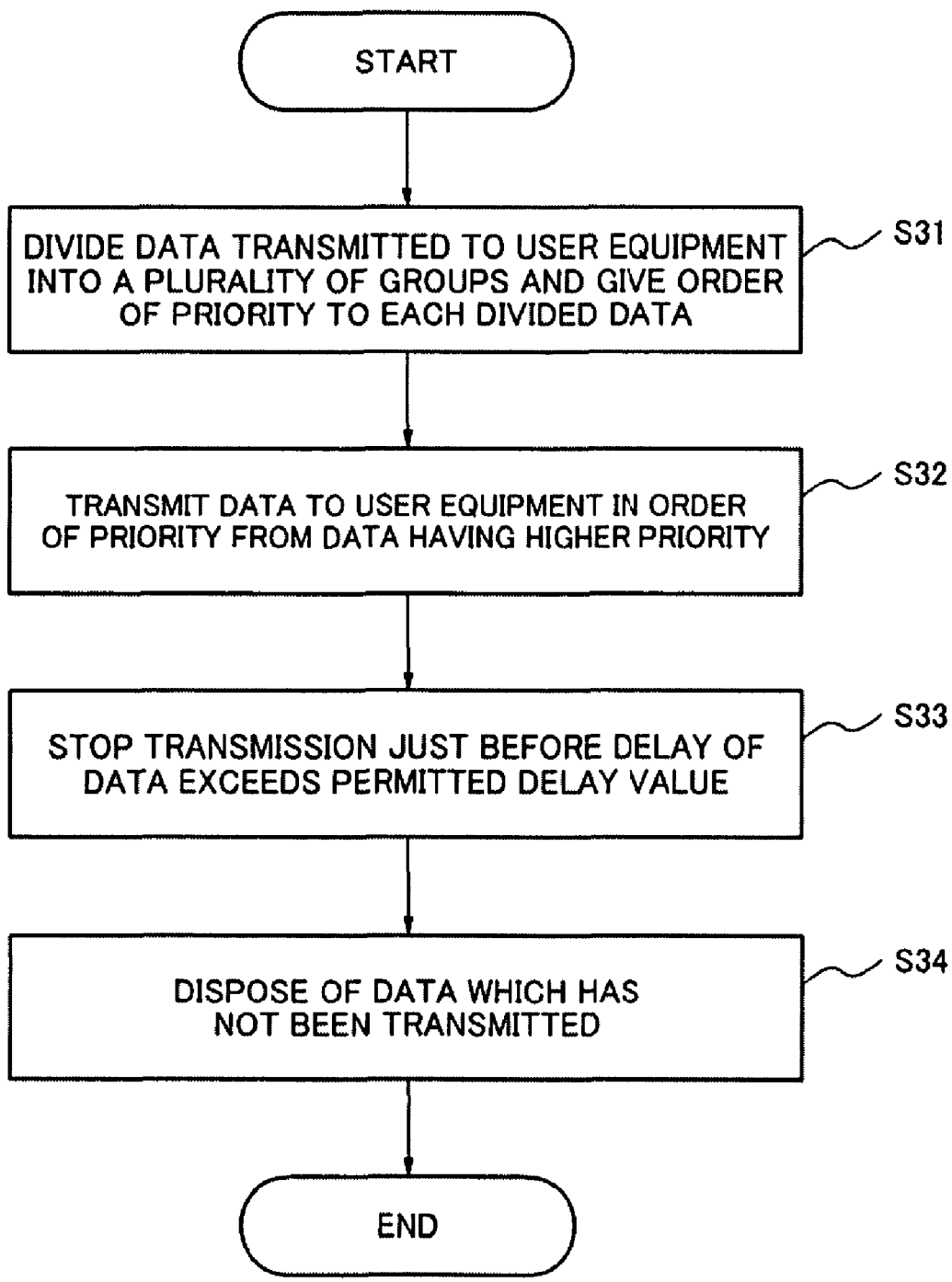
FIG. 6 is a flowchart showing an example of an operation of a hand-over target base station in an exemplary embodiment 4.
Figure 7:
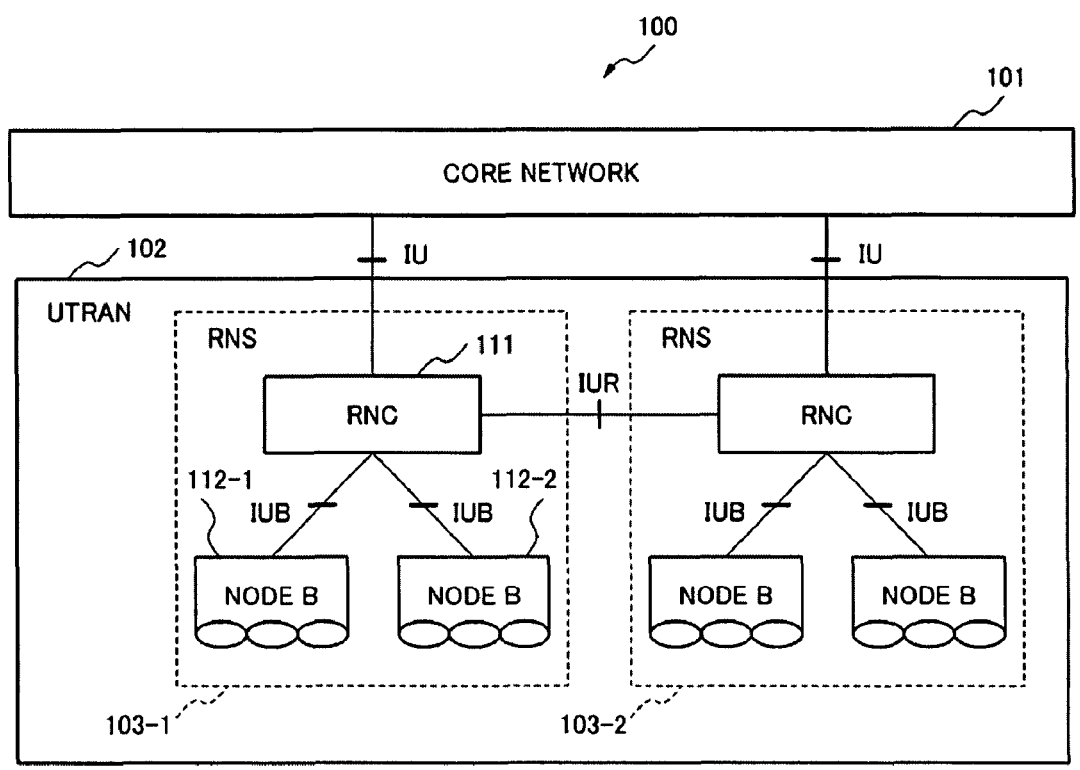
FIG. 7 is a figure showing an example of a mobile communication system which is a related art of the present invention.

FIG. 6 is a flowchart showing an example of an operation in a hand-over target base station in the exemplary embodiment 4.

First, a control part of the hand-over target base station 11-2 divides data to be transmitted to the user equipment 4 into a plurality of groups based on a delay amount. The control part gives a priority to each of divided data groups (Step S31). That is, a higher priority is given to data having a large delay value.

Next, the control part transmits data to the user equipment 4 using an UE-side communication part in order of priority (Step S32). The control part stops a transmission operation of the UE-side communication part just before a delay of data exceeds a permitted delay value (step S33). Then, data which is not transmitted to the user equipment 4 is disposed of (Step S34).

In the exemplary embodiment 4, it is possible to transmit much data, in particular, preceding data, to the user equipment 4 with a delay that is below a permitted delay value. That is, the process may reduce data disposed of.

[Exemplary Embodiment 5]

A time required for a transmission of data from the core network 2 to the hand-over source base station 11-1 may differ from a time required for a transmission of data from the core network 2 to the hand-over target base station 11-2.

In such case, in some of exemplary embodiments mentioned above, the hand-over target base station 11-2 may transmit data whose delay exceeds a permitted delay value to user equipment. The reason is because the time required for a transmission of data from the core network 2 to the hand-over source base station 11-1 is not taken into consideration. That is, even when the hand-over target base station 11-2 transmits data to the user equipment 4 in a range of a permitted delay value specified for the station 11-2, a period of time from transmission of the data by an upper level apparatus to transmission of thereof to the user equipment 4 by the station 11-2 may exceed a permitted delay value.

However, in the above-mentioned exemplary embodiment 2, when a value of (1) or a value of (2) is embedded in the "Time" 24 shown in FIG. 5, a time required for a transmission of data from a core network to a hand-over source base station is taken into consideration. Accordingly, a situation above-mentioned does not occur.

In the exemplary embodiment 5, a total of a measured delay value in the hand-over source base station 11-1 and a time required for a transmission of data from an upper level apparatus of the core network 2 to the hand-over source base station 11-1 is calculated. The control part 15 stores the total value in the "Delayed Time" 22 shown in FIG. 2. The hand-over source base station 11-1 transmits a forwarding packet created in such a manner to the hand-over target base station 11-2.

When each of an upper level apparatus in the core network 2, the radio base stations 11-1 and 11-2 include a timer which is set to an exact time, a measurement of a propagation delay between the upper level apparatus and the radio base station is easy. In such case, for example, a radio base station can measure a propagation delay between an upper level apparatus and a radio base station as follows.

First, the upper level apparatus stores a transmission time in a packet for a propagation delay time measurement and transmits the packet to a radio base station. A radio base station can know a propagation delay time between the upper level apparatus and the radio base station using a reception time of the packet for a propagation delay time measurement and the transmission time stored in the packet.

When each timer of an upper level apparatus, the radio base stations 11-1 and 11-2 is not set to an exact time, for example, a radio base station can measure a propagation delay between an upper level apparatus and a radio base station as follows.

In the example, first, a radio base station (for example, the radio base station 11-1) transmits a packet for a propagation delay time measurement in which a transmission time T1 is recorded to an upper level apparatus. When receiving the packet for a propagation delay time measurement, the upper level apparatus returns back the packet for a propagation delay time measurement in which a reception time T2 and a transmission time T3 are additionally recorded to the radio base station 11-1. The radio base station 11-1 receives the packet at the time T4. The radio base station 11-1 calculates a propagation delay time between an upper level apparatus and a radio base station by a following equation, $$[(T4-T1)-(T3-T2)]/2 \qquad (1)$$

where T1 and T4 are clock times measured by a timer of a radio base station, and T2 and T3 are clock times measured by a timer of an upper level apparatus. A calculation result of the equation (1) is not depended on set time difference between a timer of an upper level apparatus and a timer of a radio base station.

In the exemplary embodiment 5, a time required for a transmission of data from the core network 2 to the hand-over source base station 11-1 is taken into consideration. Accordingly, the hand-over target base station 11-2 can properly identify data that includes a delay within a range of a permitted delay value.

[Exemplary Embodiment 6]

The exemplary embodiment 6 relates to a program of a hand-over method. Referring to FIG. 4, it is clear that the hand-over source base station (eNodeB) 11-1 and the hand-over target base station 11-2 mainly perform a procedure of a hand-over process.

The exemplary embodiment 6 relates to a program that indicates a procedure of a hand-over process in the radio base stations 11-1 and 11-2.

The radio base station 11 includes a program storing part 17 with reference to FIG. 3.

The program storing part 17 stores for example, a program that makes a computer to carry out a hand-over process indicated by a sequence chart shown in FIG. 4.

Referring to FIG. 3, the control part (i.e. computer) 15 of the radio base station 11 reads out a program of a hand-over process from the program storing part 17 and controls the core network side communication part 12, the UE-side communication part 13, the inter-node communication part 14 and the memory part 16 according to the program. Because a content of the control has been already described, a duplicated description will be omitted.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

Further, it is the inventor's intention to retain all equivalents of the claimed invention even if the claims are amended during prosecution.

What is claimed is:

1. A mobile communication system comprising:
a hand-over source base station which transmits data received from an upper level apparatus of said mobile communication system to a user equipment before performing a hand-over operation, transmits signal information including a permitted delay value when requesting the hand-over operation, and transmits a forwarding packet including data which is not transmitted to said user equipment and delay value identification information for specifying a delay value which represents a period of time being held in the hand-over source base station of said data while performing the hand-over operation; and
a hand-over target base station which receives the signal information and accepts the hand-over operation, receives said forwarding packet transmitted by the hand-over source base station while performing the hand-over operation, and transmits said data to said user equipment so as not to exceed the predetermined permitted delay value with referring to said delay value identification information of the forwarding packet after completing the hand-over operation,
wherein:
said delay value identification information is a measured time value which is measured by said hand-over source base station for a time period from reception of said data from said upper level apparatus to transmission of said data from said hand-over source base station, and
said hand-over target base station disposes data whose delay value exceeds said predetermined permitted delay value before transmitting to said user equipment.

2. The mobile communication system according to claim 1, wherein said forwarding packet transmitted from said hand-over source base station to said hand-over target base station includes data for which an acknowledgement from said user equipment has not been received by said hand-over source base station.

3. The mobile communication system according to claim 2 wherein said hand-over source base station transmits said forwarding packet for said data which is held in said hand-over source base station and not transmitted to said user equipment when said hand-over target base station has accepted the hand-over operation, and transmits said forwarding packet for said data which is transmitted to said hand-over source base station from said upper level apparatus until completion of the hand-over operation.

4. The mobile communication system according to claim 3 wherein said delay value identification information includes each of time information when said upper level apparatus received said data, when said upper level apparatus transmitted said data and when said hand-over source base station transmitted said data, and
wherein each of said upper level apparatus, said hand-over source base station and said hand-over target base station has a timer which is synchronized among said upper level apparatus, said hand-over source base station and said hand-over target base station.

5. The mobile communication system according to claim 3 wherein said delay value identification information includes a propagation delay time between said upper level apparatus and said hand-over source base station measured by said hand-over source base station.

6. The mobile communication system according to claim 3 wherein said hand-over target base station preferentially transmits data received from said hand-over source base station to said user equipment based on said delay value identification information.

7. The mobile communication system according to claim 6 wherein said hand-over target base station gives priority to a group of data to be transmitted to said user equipment based on said delay value identification information, and transmits said data to said user equipment in order of priority given to said group.

8. A radio base station in a mobile communication system comprising:
a user equipment communication part for communicating with an user equipment in own cell provided by said radio base station;
a core network communication part for communicating with an upper level apparatus in said mobile communication system;
an inter-node communication part for communicating with other radio base station while performing a hand-over operation;
a timer unit for measuring a time period from reception of data from said upper level apparatus to transmission of said data;
a control part which performs a control operation for transmitting signal information including a permitted delay value when requesting the hand-over operation, transmitting a forwarding packet including data which is not transmitted to said user equipment and delay value identification information for specifying a delay value measured by said timer unit and representing a period of time being held in own radio base station of said data to other radio base station which works as a hand-over target base station while performing the hand-over operation via said inter-node communication part when said radio base station works as a hand-over source base station, receiving the signal information and accepting the hand-over operation, receiving said forwarding packet transmitted via said inter-node communication part while performing the hand-over operation, and transmitting said data received from other radio base station which works as said hand-over source base station via said inter-node communication part to said user equipment so as not to exceed the predetermined permitted delay value while referring to said delay value identification information of the forwarding packet after completing the hand-over operation when said radio base station works as said hand-over target base station,
wherein when said radio base station works as said hand-over target base station, data whose delay value exceeds said predetermined permitted delay value before transmitting to said user equipment is disposed.

9. The radio base station according to claim 8, wherein said forwarding packet transmitted to said other radio base station includes data for which an acknowledgement from said user equipment has not been received.

10. The radio base station according to claim 9, wherein said control part performs a control operation as said hand-over source base station for transmitting said forwarding packet for said data which is held in own radio base station and not transmitted to said user equipment when said hand-over target base station has accepted the hand-over operation, and transmitting said forwarding packet for said data which is transmitted to own radio base station from said upper level apparatus until completion of the hand-over operation.

11. The radio base station according to claim 10 wherein said delay value identification information includes a propagation delay time between said upper level apparatus and said radio base station measured by said radio base station when said radio base station works as said hand-over source base station.

12. The radio base station according to claim 10 wherein said radio base station which works as said hand-over target base station preferentially transmits data received from said other radio base station which works as said hand-over source base station to said user equipment based on said delay value identification information.

13. The radio base station according to claim 12 wherein said radio base station which works as said hand-over target base station gives priority to a group of data to be transmitted to said user equipment based on said delay value identification information, and transmits said data to said user equipment in order of priority given to said group.

14. A hand-over method used in a mobile communication system comprising:
transmitting data received from an upper level apparatus of said mobile communication system at a hand-over source base station to an user equipment before performing a hand-over operation;
transmitting signal information including a permitted delay value from said hand-over source base station to a hand-over target base station when requesting the hand-over operation;
transmitting a forwarding packet including data which is not transmitted to said user equipment and delay value identification information for specifying a delay value which represents a period of time being held in the hand-over source base station of said data from said hand-over source base station to said hand-over target base station while performing the hand-over operation;
receiving the signal information and accepting the hand-over operation at said hand-over target base station;
receiving said forwarding packet at said hand-over target base station while performing the hand-over operation;
transmitting said data received from the hand-over source base station at said hand-over target base station to said user equipment so as not to exceed a predetermined permitted delay value with referring to said delay value identification information of the forwarding packet after completing the hand-over operation; and
disposing said data received from the hand-over source base station at said hand-over target base station when delay value of said data exceeds said predetermined permitted delay value before transmitting to said user equipment,
wherein said delay value identification information is a measured time value which is measured by said hand-over source base station for a time period from reception of said data from said upper level apparatus to transmission of said data from said hand-over source base station.

15. The hand-over method according to claim 14, wherein said forwarding packet transmitted from said hand-over source base station to said hand-over target base station includes data for which an acknowledgement from said user equipment has not been received by said hand-over source base station.

16. The hand-over method according to claim 15 wherein said transmitting a forwarding packet step by hand-over source base station further comprising:
transmitting said forwarding packet for said data which is held in said hand-over source base station and not transmitted to said user equipment when said hand-over target base station has accepted the hand-over operation; and
transmitting said forwarding packet for said data which is transmitted to said hand-over source base station from said upper level apparatus until completion of the hand-over operation.

17. The hand-over method according to claim 16 wherein said delay value identification information includes each of time information when said upper level apparatus received said data, when said upper level apparatus transmitted said data and when said hand-over source base station transmitted said data, and
wherein each of said upper level apparatus, said hand-over source base station and said hand-over target base station has a timer which is synchronized among said upper level apparatus, said hand-over source base station and said hand-over target base station.

18. The hand-over method according to claim 16 wherein said delay value identification information includes a propagation delay time between said upper level apparatus and said hand-over source base station measured by said hand-over source base station.

19. The hand-over method according to claim 16 wherein said step of transmitting said data received from the hand-over source base station at said hand-over target base station comprising:
preferentially transmitting data received from said hand-over source base station to said user equipment based on said delay value identification information.

20. The hand-over method according to claim 19 wherein said step of preferentially transmitting data comprising:
giving priority to a group of data to be transmitted to said user equipment based on said delay value identification information; and
transmitting said data to said user equipment in order of priority given to said group.

* * * * *